United States Patent [19]

Fennema et al.

[11] Patent Number: 5,128,913
[45] Date of Patent: Jul. 7, 1992

[54] ACQUIRING FOCUS IN AN OPTICAL SYSTEM USING A SOFT FOCUS ACQUIRING SYSTEM

[75] Inventors: Alan A. Fennema; Spencer D. Roberts, both of Tucson, Ariz.

[73] Assignee: Internatinoal Business Machines Corporation, Armonk, N.Y.

[21] Appl. No.: 533,305

[22] Filed: Jun. 4, 1990

[51] Int. Cl.⁵ .............................................. G11B 7/085
[52] U.S. Cl. ............................... 369/44.27; 250/201.5
[58] Field of Search ...................... 250/201.4, 201.5; 369/44.27, 44.29, 44.31, 44.28, 95

[56] References Cited

U.S. PATENT DOCUMENTS

| | | | |
|---|---|---|---|
| 4,544,837 | 10/1985 | Tanaka et al. | 250/201.4 |
| 4,703,466 | 10/1987 | Konno | 369/44.29 |
| 4,733,066 | 3/1988 | Konno et al. | 250/201.5 |
| 5,010,538 | 4/1991 | Takeda et al. | 369/44.36 |
| 5,020,045 | 5/1991 | Smart et al. | 369/44.29 |

FOREIGN PATENT DOCUMENTS 209146 1/1987 European Pat. Off. .

Primary Examiner—Roy N. Envall, Jr.
Assistant Examiner—Jennifer L. Hazard
Attorney, Agent, or Firm—H. F. Somermeyer

[57] ABSTRACT

The focus acquisition system on optical disk recorder as well as other optical systems, uses repeated pulse position pulses with interlead coasting of an objective lens for providing a soft focus acquire. The pulse energization of the lens to move toward an in-focus condition overcomes stiction and friction. While the coasting allows the energy level applied to the lens movement to be minimal, i.e. soft, the purpose of the interdirectional pulse control actuation is to overcome friction without requiring large power to the lens which can cause an overshoot of the lens at the in-focus position. Compensation techniques and stopping the lens at the in-focus position are also shown.

12 Claims, 2 Drawing Sheets

ACQUIRING FOCUS IN AN OPTICAL SYSTEM USING A SOFT FOCUS ACQUIRING SYSTEM

FIELD OF THE INVENTION

The present invention relates to optical systems, particularly focusing systems and the acquisition of focus in such systems. The present invention is particularly useful for optical disk recorders.

BACKGROUND OF THE INVENTION

Optical disk recorders, in particular, employ objective lens having very small size and mass. Typically, such objective lenses are slideably mounted on a moveable support such that the beam passing through the objective lens is appropriately focused and positioned with respect to a record member. Generally, the acquisition of focus i.e., the movement of the objective lens to an in-focus position wherein the laser or other light beam is appropriately focused at the recording level, should be reliably accomplished for preventing retrys and delays in using an optical disk recorder. Also the best focus should be quickly and accurately obtained. It is desired also to ensure that the control of the focus acquisition is simplified for reducing costs of the optical system.

One of the problems involved in accurately acquiring focus is that of stiction. That is, as the objective lens is urged toward the in-focus position from an out of focus position, the lens may be subjected to undesired friction causing undesired and erratic motions in the focus acquisition process. Such undesired changes in friction reduces the probability of rapidly and accurately acquiring focus. It is desired to provide a simple system which aviates the stiction problem and provides accurate focus acquisition at low cost.

DISCUSSION OF THE PRIOR ART

Konno et al. U.S. Pat. No. 4,733,066 shows a typical prior art focus acquisition system in which focus acquisition is acquired during a so-called open loop mode. Then upon detecting an in-focus condition, a focus maintenance servo is actuated for maintaining the focus of the objective lens. Konno et al. also show the typical control signal having a ramp shape for moving the objective lens to the in-focus position. Konno et al. require a resilient means for supporting the focusing lens. Such resilient means is desired to be eliminated.

European Patent Application Publication 209,146 (al) shows a focus acquisition system apparently intended to overcome stiction and frictional effects as discussed in the Background of the Invention. According to this published application, the electrical current supplied to a coil for moving the objective lens toward the in-focus position is reversed for momentarily urging the objective lens to move away from the in-focus position. Apparently, the magnitude of the current for driving the objective lens toward the in-focus position when it is turned on, is greater than the magnitude of the current which urges the lens to move in the reverse direction. A damper 46 shown in the patent apparently is necessary for providing a smooth approach to the in-focus position. Column 4 of the reference, particularly the discussion beginning at line 44 describes the above system.

In clear contradistinction to this teaching, applicants invention provides a focus acquisition system not requiring a damper, not requiring a reverse current which results in a rather hard control. The present invention provides a soft focus acquisition in which the direction of the objective lens is moved toward the in-focus position by a series of pulses which momentarily urge the objective lens toward the in-focus position interspersed with coasting periods. It is found that this system provides a facile and inexpensive focus acquisition system which is accurate, uses minimum power, and reliability acquires focus on a repeated basis.

SUMMARY OF THE INVENTION

It is an object of the present invention to provide a soft focus acquisition method and system for optical systems.

In accordance with the invention, an objective lens is moved toward an in-focus position in a series of repeated steps of a pulse driving the lens followed by a short coasting period. In-focus condition is detected using light reflected from the plane to which the beam is to be focused.

The foregoing and other objects, features and advantages of the invention will be apparent from the following more particular description of preferred embodiments of the invention, as illustrated in the accompanying drawings.

DETAILED DESCRIPTION

Figure 1:
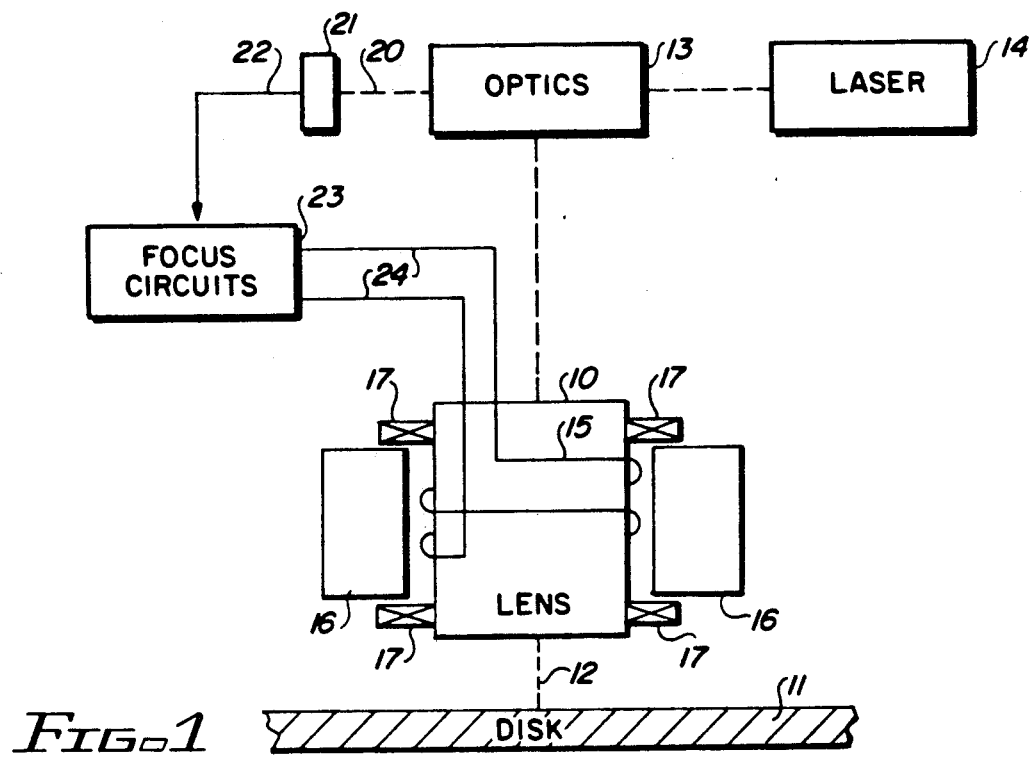
FIG. 1 is a simplified diagrammatic showing of a focusing system employing the present invention in an optical disk apparatus.

Referring more particularly to the appended drawing, like numerals indicate like parts of structural features in the various figs. An objective lens 10 is to provide focus of a beam 12 on disk 11 for recording or sensing information on the disk 11. The beam 12 is aligned with the optical axis of objective lens 10 in the usual manner. Optics 13, of usual design in optical disk recorders, optically couples the objective lens 10 to a laser 14 for receiving the light beam that travels along path 12. A focusing coil 15, mounted about the lens 10 and preferably movable therewith, generates magnetic fields which co-act with the stationary magnetic fields from permanent magnet 16 which are suitably mounted on a frame (not shown). A set of bearings 17 slideably support lens 10 for movement along its optical axis. It is to be understood that track seeking and track following motions which are perpendicular to the optical axis of lens 10 are provided in the usual manner.

Disk 11 reflects the laser 14 supplied light through objective lens 10 to optics 13. Optics 13 in a usual manner redirects the reflected light along path 20 to focus detector 21. Focus detector 21 supplies a focus error signal FES over electrical line 22 to focus circuits 23. Focus circuits 23 are coupled to coil 15 by a pair of signal lines 24 for supplying appropriate focus control signals, as will become apparent.

Figure 2:
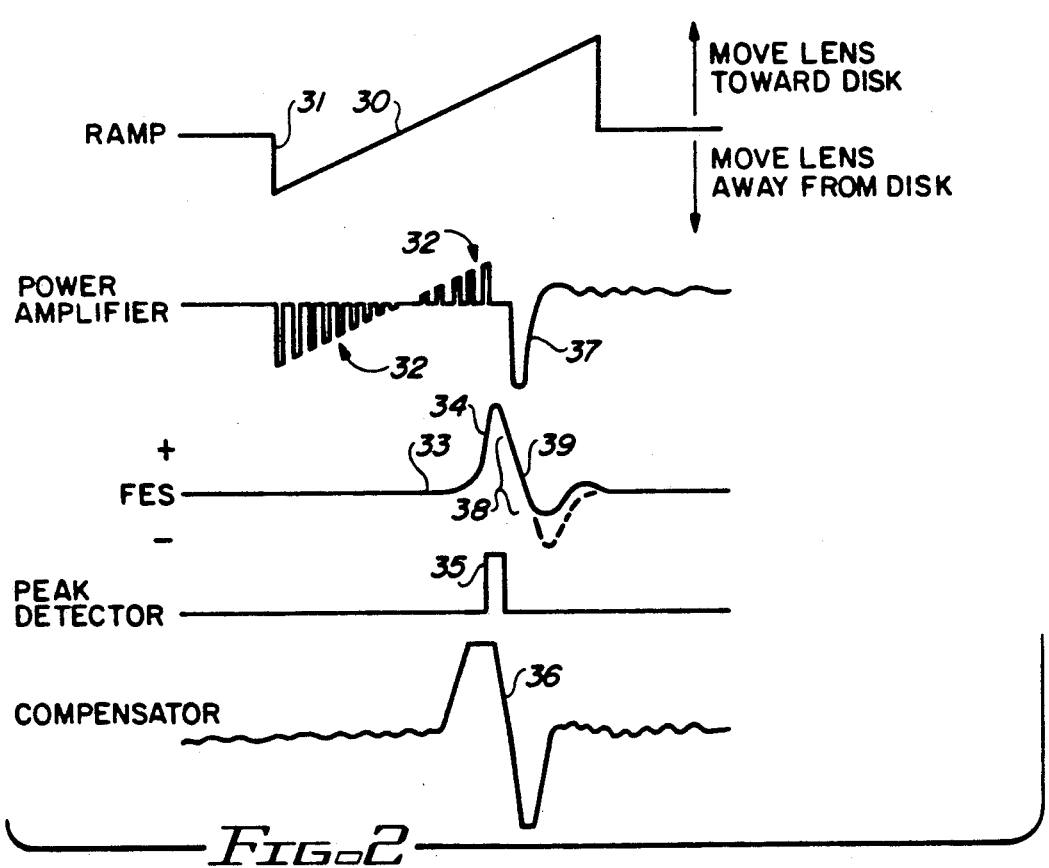
FIG. 2 is a set of idealized wave forms used to illustrate the operation of the FIG. 1 illustrated apparatus.

FIG. 2 illustrates an open loop position control signal 30 in the shape of a ramp which is designed to move the objective lens 10 toward the disk 11 for acquiring focus of the laser 14 beam. Initially, at reverse step 31 lens 14 is moved by signal 30 to a most remote position, i.e., furthest position away from disk 11 which is a clear out-of-focus condition as indicated by the signal 33 portion of FES. Ramp 30 is modulated as represented by position control pulses 32. The position control pulses 32 momentarily and repeatedly urge the lens 10 to move closer to the in-focus position, i.e., away from the position indicated by numeral 31. The lens 10 is allowed to coast between each successive pulse 32, thereby providing a soft control of the lens 10 movement within bearings 17. The pulse control tends to overcome any stiction or friction which would cause lens 10 to bind and tend not to move toward disk 11. In the prior art, such stiction could cause the lens 10 to momentarily lock up, then a position control signal which is usually in the shape of the ramp 30 causes lens 10 to overshoot the in-focus position, requiring a focus retry. It has been determined the position control pulses 32 which repeatedly momentarily urge the lens 10 toward disk 11 overcome the stiction. Intermediate lens 10 coasting prevents accumulation of difference between the actual lens 10 position and the desired position indicated by ramp 30. Pulses 32 are modulated within a power amplifier as will become apparent.

The focus error signal at 33 indicates a complete out-of-focus condition of positive excursion 34 indicates an approach to the in-focus position at point 39. The peak 34 is detected resulting in a peak detected output signal 35. At this point, the pulses 32 are terminated and the lens is allowed to coast toward in-focus condition 39. A stopping or reversing pulse 37 stops the lens 10 within the focus maintenance zone of point 39 such that the focus maintenance servos (not shown) maintain the focus of the lens at point 39. Focus control circuits include a compensator which provides a modification of control to the power amplifier as represented by numeral 36 in FIG. 2.

Figure 3:
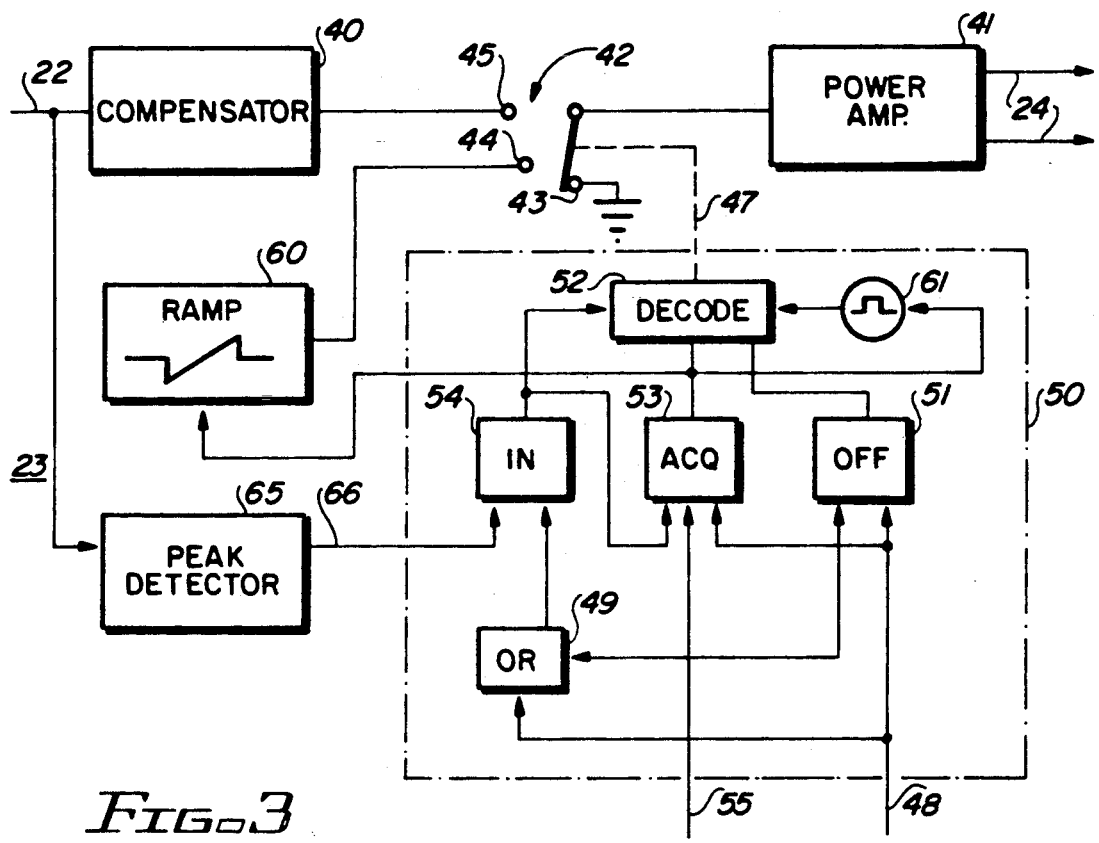
FIG. 3 is an in-focus detection and focus acquisition system usable with the FIG. 1 illustrated apparatus.

FIG. 3 illustrates, in block diagram form, first-described focus acquisition circuits of focus circuits 23. FES on line 22 is supplied to compensator 40 which provides the function 36 shown in FIG. 2. Compensator 40 is in that portion of the focus circuits which maintains in-focus conditions. Power amplifier 41 supplies the signals over lines 24 to focus control coil 15. Electronic switch 42 is electrically actuated as will become apparent. At terminal 43, the power amplifier 41 is set to a voltage reference, such as ground reference potential. At this point, no signals are supplied over lines 24, hence the lens 10 is not moved. Terminal 44 connects the power amplifier 41 to later described focus acquisition circuits which generate the ramp 30. Terminal 45 is connected to compensator 40 and is used during focus maintenance conditions, i.e. after the lens 10 has reached the in-focus position.

Control of switch 42 is indicated by dashed line 47 which is controlled by focus state control 50. On power on, the actual location of lens 10 is not known. The power on reset signal supplied over line 48 sets the off flip-flop 51 to the active state. Off flip-flop 51 sends a signal to decode circuit 52 which in turn responds by actuating switch 42 to position 43 such that lens 10 is not inadvertently actuated during power up sequencing. The line 48 power on reset signal also travels through OR circuit 49 to reset in-focus indicating "IN" flip-flop 54 and also resets acquire ACQ flip-flop 53. In this machine state, lens 10 resides in a initial unknown position.

To acquire focus i.e., move lens 10 to the in-focus position, a focus acquire signal on line 55 sets ACQ flip-flop, 53 to the active condition for initiating focus acquisition, it carries the signal through OR circuit 49 to again reset the in-focus condition flip-flop 54 and reset OFF flip-flop 51. Resetting IN flip-flop 54 also enables reacquiring focus in the case that focus was lost or it is desired to recalibrate and reacquire focus in error recovery procedures. As soon as ACQ flip-flop 53 is set to the active condition, three operations occur simultaneously. ACQ flip-flop 53 actuates ramp generator 60 to generate the ramp signal 30 which is initially designed to move the lens 10 to the remote out-of-focus position. Ramp generator 60 then supplies the ramp to terminal 44. Pulse generator 61 supplies pulses to decode circuit 52 to repeatedly actuate switch 42 to move the connections of power amplifier 41 input between terminals 43 and 44 thereby generating the pulses 32. Decode circuit 52 receives the ACQ flip-flop 53 active signal for passing the pulses from pulse generator 61. This is the second state of the three state machine control 50.

During the pulse soft movement of lens 10 from the remote auto focus position towards the in-focus position, peak detector 65 monitors FES on line 22 for detecting peak 34. It is well known that the FES signal near the in-focus position 39 as a maximum peak amplitude 34 which defines a remote auto focus extremity of a focus maintenance linear region on which point 39 resides i.e., straight line 38 portion of FES. IN flip-flop 54, when set, supplies an activating signal to decode 52 which responds to actuate switch 42 to connect terminal 45 to power amplifier 41 for maintaining the focus just acquired. IN flip-flop 54 also is connected to the reset input of ACQ 53 for holding it in the reset state while an in-focus condition is maintained. At this point in time, compensator 40 being connected provides the compensation 36 shown in FIG. 2 which ensures good focus acquisition.

Figure 4:
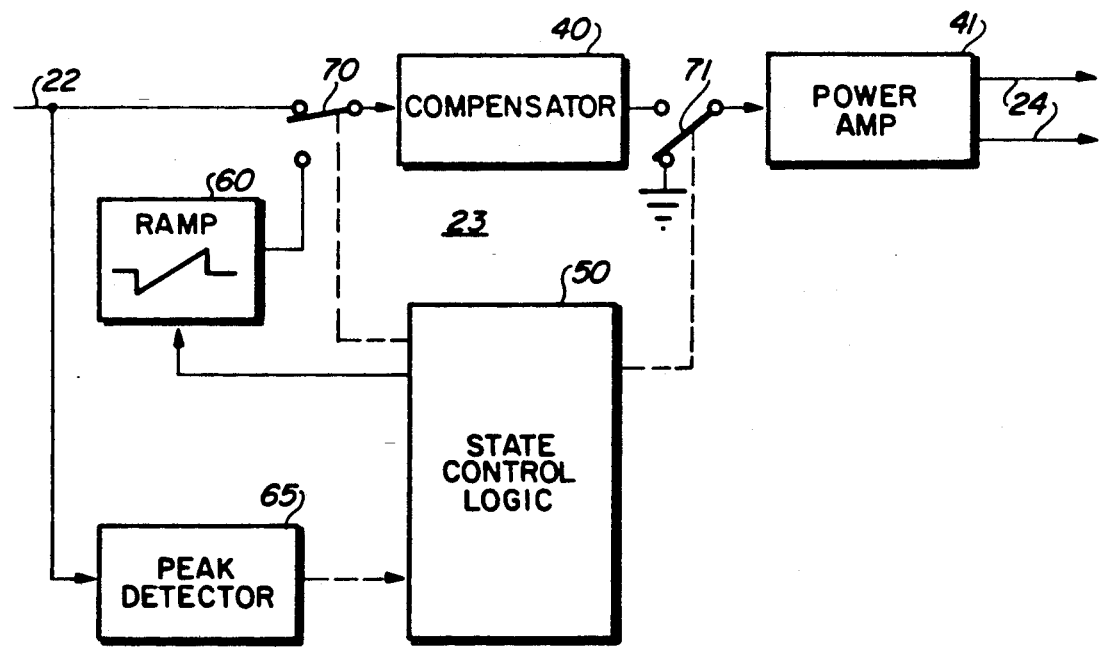
FIG. 4 is a block diagram showing an embodiment which is alternate to the FIG. 3 illustrated embodiment of focus acquisition control.

FIG. 4 is a simplified diagram using the same principles as shown in FIG. 3 but with using two electronic switches rather than a single electronic switch. Operation of the two circuits are identical. Switch 42 is replaced by two separate switches 70 and 71. Switch 70 connects ramp generator 60 through compensator 40 to power amplifier 41 as opposed to the direct connection shown in FIG. 3. This arrangement provides for better effect of compensator 40 action represented by numeral 36 of FIG. 2. During focus acquisition state control logic 50 supplies an actuating signal to electronic switch 70 for moving it to connect ramp generator 60 to compensator 40. The generation of pulses 32 is achieved by switch 71 which is pulsed by state control logic 50 in the same manner as switch 42 was between terminals 43 and 44. In the reset or initial power on state, it is not known the electronic state of switches 70 and 71. The off control state of control 50 moves switch 71 to the ground reference potential and switch 70 to the position shown. Upon starting focus acquisition, switch 70 is actuated to couple ramp 60 to compensate 40 and switch 71 modulates the ramp signal by momentary actuations by state control object 50. Upon acquiring focus, as indicated by peak detector 65, state control 50 actuates switch 70 to the illustrated position for connecting FES line 22 directly to compensator 40 and actuates switch 71 to couple compensator 40 to power amplifier 41.

While the invention has been particularly shown and described with reference to preferred embodiments thereof, it will be understood by those skilled in the art that various changes in form and details may be made therein without departing from the spirit and scope of the invention:

What is claimed is:

1. In a machine-effected method of acquiring focus of an objective lens with respect to a predetermined plane at which a light beam passing through the lens is to be focussed by moving the lens along its optical axis toward the plane, the machine-executed steps of:

moving the lens toward the plane in a series of a plurality of steps, each of said steps including a pulse for driving the lens and a period of time for not driving the lens for allowing the lens to coast; and detecting a near in-focus condition of the light reflected from the plane and stopping said steps.

2. In the method set forth in claim 1, further including the machine-executed steps of:

selecting said pulse for driving to be position controlling pulses and changing the amplitude of the pulse for driving to decrease the distance between the lens and the plane.

3. In the method set forth in claim 2, further including the machine-executed steps of:

selecting the change in amplitude of the pulse-driving to be a predetermined energy change such that the energy imparted to the lens being moved toward an in-focus position is repeatedly urged toward the in-focus position at a speed less than a predetermined speed along its optical axis.

4. In the method set forth in claim 3, further including the machine-executed steps of:

upon detecting said near in-focus condition, applying a predetermined braking drive to said lens for ensuring in-focus capture.

5. In the method set forth in claim 4, further including the machine-executed steps of:

in said amplitude changing between steps is a constant change amplitude such that the envelope of the driving pulses is a linear ramp.

6. In the method set forth in claim 2, further including the machine-executed steps of:

supplying a first set of said position controlling pulses which change the position of the lens further away from the in-focus position than the initial position of the lens.

7. In a machine-effected method of acquiring focus of an objective lens with respect to a predetermined plane at which a light beam passing through the lens is to be focussed by moving the lens along its optical axis to an in-focus position, the machine-executed steps of:

applying a series of pulsating uni-directional motions to the lens for moving the lens along its optical axis toward the in-focus position; and intermediate said pulsating uni-directional motions allowing the lens to coast toward said in-focus position.

8. In the method set forth in claim 7, further including the machine-executed steps of:

detecting a near in-focus position of said lens; and then stopping said pulsating uni-directional motions and applying a braking action to lens for ensuring focus acquisition.

9. In optical device having an optical record medium and optics for sending and receiving a light beam to and from the record medium, the optics including a lens movable along its optical axis toward and away from the record medium for focussing the light beam at the record medium, the improvement including, in combination;

a lens position control means coupled to the lens for moving said lens along its optical axis for focussing the light beam at the record medium;

focus detection means optically coupled to the lens for receiving light reflected from the record medium for indicating focus error;

focus correction means coupled to the focus detection means and to the control means for responding to the indicated focus error for actuating the control means to move the lens toward an in-focus position whereat the light beam is focussed at the record medium as a focus correction operation;

focus acquisition means coupled to the focus correction means, to the focus detection means and to the control means for overriding the focus correction operation to move said lens toward the in-focus position including pulsating means for repeatedly uni-directionally driving the lens toward the in-focus position as a series of uni-directional pulsed steps said pulsating means generating lens coasting periods between each of the uni-directional pulsed steps and preventing driving the lens during each of said lens coasting periods.

10. In the optical device set forth in claim 9, further including, in combination:

said focus acquisition means including a ramp generator for supplying a ramp signal for driving the lens toward the in-focus position;

switching means electrically interposed between said control means, said focus detection means and said ramp generator and being connected to the focus acquisition means for responding thereto for connecting the focus detection means to the control means for focus operations and to the ramp generator for focus acquisition; and electrical pulse means in the focus acquisition means for actuating the control means to supply a plurality of uni-directional lens driving pulses having amplitudes in accordance with said ramp signal amplitudes and intermediate the uni-directional driving pulses supplying respective lens coasting signals.

11. A focus acquisition means for moving a lens along its optical axis toward an in-focus position, including, in combination;

means for supporting and moving the lens along its optical axis for focussing the lens;

means for detecting an focus error of the lens;

pulsating signal means coupled to the moving means for supplying a stream of drive electrical pulses for actuating the moving means to move the lens toward an in-focus position and including periods between the pulses for allowing the lens to coast under no power along its optical axis.

12. In the means set forth in claim 11, further including, in combination;

stopping means connected to said detecting means and to said moving means for responding to said detecting means indicating a near focus condition to momentarily actuate said moving means to brake the lens motion for acquiring focus; and focus maintenance means coupled to the detecting means, to said moving means and to said stopping means for actuating the moving means to maintain focus after said stopping means actuated said moving means to brake the lens motion.

* * * * *